United States Patent
Gutman et al.

(10) Patent No.: US 8,259,735 B2
(45) Date of Patent: Sep. 4, 2012

(54) CONSTANT BIT RATE VIDEO STREAM

(75) Inventors: Ron Gutman, Encinitas, CA (US); Doron Segev, Tel-Aviv (IL)

(73) Assignee: Imagine Communications Ltd., Netanya (IL)

( * ) Notice: Subject to any disclaimer, the term of this patent is extended or adjusted under 35 U.S.C. 154(b) by 1020 days.

(21) Appl. No.: 12/221,975

(22) Filed: Aug. 8, 2008

(65) Prior Publication Data

US 2009/0052552 A1   Feb. 26, 2009

Related U.S. Application Data

(60) Provisional application No. 60/954,876, filed on Aug. 9, 2007.

(51) Int. Cl.
*H04L 12/28* (2006.01)
*H04L 12/56* (2006.01)

(52) U.S. Cl. ......... 370/395.61; 370/395.21; 370/395.43; 370/395.64; 370/395.65; 380/212

(58) Field of Classification Search ............. 375/240.03, 375/240.05, 240.26, 131, 240.01–240.29; 715/724; 704/500; 725/86; 370/395.21–391.65
See application file for complete search history.

(56) References Cited

U.S. PATENT DOCUMENTS

| 5,734,432 | A | * | 3/1998 | Netravali et al. | 375/240.05 |
|---|---|---|---|---|---|
| 5,956,088 | A | | 9/1999 | Shen et al. | |
| 5,966,120 | A | * | 10/1999 | Arazi et al. | 715/724 |
| 6,330,286 | B1 | * | 12/2001 | Lyons et al. | 375/240.28 |
| 6,795,506 | B1 | * | 9/2004 | Zhang et al. | 375/240.26 |
| 7,159,233 | B2 | * | 1/2007 | Son et al. | 725/86 |
| 2006/0227870 | A1 | * | 10/2006 | Tian et al. | 375/240.03 |
| 2007/0223564 | A1 | * | 9/2007 | Bruls et al. | 375/131 |
| 2008/0109230 | A1 | * | 5/2008 | Thumpudi et al. | 704/500 |
| 2010/0008421 | A1 | | 1/2010 | Gutman et al. | |

FOREIGN PATENT DOCUMENTS

| WO | 2005109895 A1 | 11/2005 |
| WO | 2006061838 A2 | 6/2006 |
| WO | 2006099086 A1 | 9/2006 |

* cited by examiner

*Primary Examiner* — Sath V Perungavoor
*Assistant Examiner* — Nathnael Aynalem
(74) *Attorney, Agent, or Firm* — D. Kligler I.P. Services Ltd.

(57) ABSTRACT

A method of media transmission. The method includes providing at least one variable bit rate (VBR) video stream and multiplexing the at least one VBR video stream together with auxiliary data related to the at least one VBR video stream, in a constant bit rate (CBR) stream. The stream is transmitted to a first receiving unit, which is adapted to discard the auxiliary data as padding and use the at least one VBR stream and to a second receiving unit, which is adapted to extract the auxiliary data and use it in further handling of the at least one VBR stream.

15 Claims, 4 Drawing Sheets

CONSTANT BIT RATE VIDEO STREAM

PRIORITY INFORMATION

This application claims the benefit under 119(e) of U.S. provisional patent application 60/954,876, filed Aug. 9, 2007, the disclosure of which is incorporated herein by reference in its entirety.

FIELD OF THE INVENTION

The present invention relates to communication systems and in particular to systems for delivering video signals.

BACKGROUND OF THE INVENTION

One of the usages of communication networks, such as cable television networks and the Internet, is provision of motion pictures in the form of video streams. Video streams are formed from a sequence of frames, which are still pictures shown at a specific instance. The transmission of video streams requires large amounts of bandwidth and therefore compression methods are generally applied to video streams before transmission. For a given quality level, some video frames (e.g., frames having a large amount of detail) can be compressed only to a small extent, while other video frames (e.g., frames merely showing a blue sky) can be compressed to a large extent. Therefore, many video compression methods provide variable bit-rate (VBR) video streams, in which different frames are compressed by different amounts.

Some communication networks and storage devices, however, are adapted to handle constant bit rate (CBR) video streams, which at all times include the same amount of data bytes. Therefore, most communication networks are required to choose between the ease of handling of CBR streams and the quality smoothness of VBR streams.

U.S. Pat. No. 5,734,432 to Netravali et al., issued Mar. 31, 1998, the disclosure of which is incorporated herein by reference, describes transmitting auxiliary signals not related to a main transmission on a channel, when a main video signal transmitted on the channel does not require all the bandwidth of the channel.

U.S. Pat. No. 5,966,120 to Arazi et al., issued Jan. 20, 2004, the disclosure of which is incorporated herein by reference, describes adding auxiliary data during transmission of one or more VBR streams to form a constant bit rate transmission. The auxiliary data includes non real time information, representing additional content beyond that included in the VBR stream. The additional content may include video clips, such as advertisements, for insertion in the video of the VBR stream and/or non-video information, such as advertisements for printing by a computer.

The above patents reduce the waste of bandwidth on the transmission channel due to the varying size of the VBR stream, by transmitting additional content on the available bandwidth. Not always, however, is there available content which needs to be transmitted with the VBR stream. In addition, the multiplexing of the additional content with the VBR stream and its separation at the destination may be a complex procedure.

Attempts have been made to achieve the ease of handling of CBR streams, with a quality level close to that of a VBR stream.

PCT patent publication WO 2006/099086, published Sep. 21, 2006 and assigned to Qualcomm Incorporated, the disclosure of which is incorporated herein by reference, describes a compression method which uses an adaptive quantization parameter, to provide a VBR quality compression (i.e., a compression with a substantially constant quality) which fits into a CBR environment. The compression method prescribes that the number of frames represented by a predetermined block size of the compressed video stream is varied over time, according to the achievable compression ratio. This method requires using a relatively large buffer which incurs a substantial delay, but does not achieve a completely smooth quality video stream. In addition, the resultant video stream is in a format not supported by some standard consumer electronic devices.

PCT patent publication WO 2005/109895, published Nov. 17, 2005 and assigned to Konin-Klijke Philips Electronics N.V., the disclosure of which is incorporated herein by reference, describes a compression method in which a low quality VBR stream is generated as a base of a compressed stream. Enhancement information is added to the VBR stream, where the compression results in a reduced amount of data, in a manner which forms a CBR stream. The resulting stream has a variable quality, having a higher quality when the VBR compression leaves much room for enhancement information and a lower quality at times when the VBR compression requires the entire available bandwidth.

SUMMARY OF THE INVENTION

An aspect of some embodiments of the present invention relates to completing one or more variable bit rate (VBR) video streams into a constant bit rate (CBR) stream, with auxiliary data for simplifying the handling of at least one of the VBR streams. In some embodiments of the invention, the auxiliary data does not substantially enhance the quality of the VBR stream, and does not substantially add content to the VBR stream. Accordingly, instead of using the available bandwidth not required for the VBR stream for providing additional data and/or for enhancing the quality of the VBR stream, in a manner which is complex, the available bandwidth is used for providing information simplifying handling.

Optionally, the auxiliary data includes replacement packets which may be used instead of portions of the variable bit rate stream. In some embodiments of the invention, the auxiliary data comprises replacement blocks, which represent higher or lower quality than corresponding blocks in the one or more VBR streams. Alternatively or additionally, the auxiliary data comprises replacement blocks providing a different format for content included in the VBR stream. Instead of replacement blocks, the auxiliary data may include hints for reformatting and/or recompressing the content of one or more portions of the VBR stream.

Alternatively or additionally, the auxiliary data comprises metadata describing at least one aspect of the structure of the one or more VBR video streams and/or of the auxiliary data. In an exemplary embodiment of the invention, the metadata includes an index to the data blocks in the variable bit rate stream and/or in the auxiliary data.

The auxiliary data may comprise non-video data. In some embodiments of the invention, the auxiliary data comprises audio data, such as audio data corresponding to the soundtrack of one or more of the video streams, in a different language than that included in the VBR streams and/or having a different audio format (e.g., stereo/surround). Further alternatively or additionally, the auxiliary data comprises instructions for re-compressing the one or more VBR video streams, such as a quantization ratio to be used for each macro-block of the streams for each of one or more compression levels.

Optionally, the auxiliary data is included in the stream in a backward compatible manner, such that a network unit not adapted to relate to the auxiliary data will be able to use the CBR stream by ignoring the auxiliary data, for example by relating to the auxiliary data as padding.

An aspect of some embodiments of the present invention relates to transmitting one or more variable bit rate (VBR) video streams encapsulated in a constant bit rate (CBR) stream, along with auxiliary data related to the one or more VBR video streams. The CBR stream is generated such that some receivers, operating in accordance with a known standard, view the stream as one or more standard VBR streams and ignore the auxiliary data as being padding, while other receivers identify the auxiliary data and use it for one or more reasons, such as statistical multiplexing and/or quality enhancement.

Optionally, the one or more VBR streams have a constant quality level. Alternatively or additionally, the one or more VBR streams together with the auxiliary data have a constant quality level. The term "constant quality level" refers herein to compressed video streams in which a same compression method degrading the video stream substantially evenly is used for compressing the entire video stream.

In some embodiments of the invention, the auxiliary data comprises data which enhances the quality and/or handling of the content of the VBR video streams, but does not add additional content. Optionally, the auxiliary data comprises scaleable video data information, such as video enhancement data and/or video replacement blocks (which represent higher or lower quality than corresponding blocks in the one or more VBR streams). Alternatively or additionally, the auxiliary data comprises metadata describing at least one aspect of the structure of the one or more VBR video streams and/or of the auxiliary data. In some embodiments of the invention, the auxiliary data comprises audio data, such as audio data corresponding to the soundtrack of one or more of the video streams, in a different language than that included in the VBR streams and/or having a different audio format (e.g., stereo/surround). Further alternatively or additionally, the auxiliary data comprises instructions for re-compressing the one or more VBR video streams, such as a quantization ratio to be used for each macro-block of the streams for each of one or more compression levels.

In a particular embodiment of the invention, a single VBR video stream is encapsulated in a constant bit rate (CBR) stream.

An aspect of some embodiments of the present invention relates to generating a CBR video stream formed of at least one VBR stream complimented with auxiliary data, which does not add substantial content beyond that included in the VBR video stream, in which the maximal size of the at least one VBR stream is a substantial portion (e.g., at least 75%, at least 90% or even substantially 100%) of the size of the CBR stream. Optionally, the maximal size of the at least one VBR stream over time is equal to the size of the CBR stream. Thus, the at least one VBR stream uses the maximal capacity of the CBR stream.

Optionally, at least 99% or even at least 99.7% of the CBR stream does not include video data, which enhances the quality of the at least one VBR stream.

An aspect of some embodiments of the present invention relates to generating a CBR video stream formed from a VBR stream complimented with non-video auxiliary data relating to the VBR stream, having content which does not substantially extend beyond the content of the VBR stream.

In some embodiments of the invention, the non-video data comprises audio data and/or meta-data. Optionally, the auxiliary data does not include video data at all. Alternatively, less than 80%, less than 60% or even less than 40% of the auxiliary data includes video data. In some embodiments of the invention, in accordance with this alternative, at least 10%, at least 20% or even at least 35% of the auxiliary data comprises video data.

An aspect of some embodiments of the present invention relates to generating a constant bit rate (CBR) video stream by compressing a video stream into a variable bit rate (VBR) stream and complimenting the variable bit rate stream with auxiliary data related to the video stream, so as to form a CBR stream with a substantially constant maximal quality when using the auxiliary data. The auxiliary data optionally does not include substantial amounts of content beyond that included in the VBR stream. In an exemplary embodiment of the invention, the auxiliary data includes less than 10%, less than 5% or even less than 1% or additional content beyond that included in the VBR stream.

In some embodiments of the invention, the variable bit rate stream has a substantially constant quality and the auxiliary data cannot be used to increase the quality of the video stream beyond that of the variable bit rate stream. Optionally, the auxiliary data may include lower quality replacement blocks for some of the data in the variable bit rate stream.

In other embodiments of the invention, the variable bit rate stream comprises portions having lower quality than other portions of the variable bit rate stream and the auxiliary data includes replacement blocks for these portions, having a higher quality.

An aspect of some embodiments of the present invention relates to generating a CBR video stream formed from a VBR stream complimented with auxiliary data including replacement blocks which represent similar or even identical video content as corresponding blocks of the VBR stream, but with a different bit content, for example due to different compression ratios and/or different encryption methods.

An aspect of some embodiments of the present invention relates to a method of handling video content in which a CBR video stream formed from one or more VBR streams complimented with auxiliary data is handled by an intermediary unit and is converted into a CBR stream formed of corresponding one or more VBR streams representing the same video content, but with different auxiliary data.

In some embodiments of the invention, the auxiliary data is different due to a change in the size of one or more of the VBR streams. Optionally, the auxiliary data includes scaleable video data which can be used to increase and/or decrease the quality of one or more of the VBR video streams. The intermediary unit optionally uses the scaleable data to adjust one or more of the VBR streams. Remaining scaleable data not used in adjusting the size of the VBR stream and/or data removed from a VBR stream whose size was decreased, is repackaged into the new CBR stream, according to the available capacity of the CBR stream.

An aspect of some embodiments of the invention relates to generating a CBR video stream formed of a VBR stream complimented with auxiliary data including complimentary video data for enhancement of the VBR stream, wherein at least one of the blocks of the complimentary video data is located in the CBR stream before the beginning of the video data in the VBR stream of the frame it is to compliment.

There is therefore provided in accordance with an exemplary embodiment of the invention, a method of media transmission, comprising providing at least one variable bit rate (VBR) video stream, multiplexing the at least one VBR video stream together with auxiliary data related to the at least one VBR video stream, in a constant bit rate (CBR) stream, transmitting the CBR stream to a first receiving unit, which discards the auxiliary data as padding and uses the at least one VBR stream and transmitting the CBR stream to a second receiving unit, which extracts the auxiliary data and uses it in further handling of the at least one VBR stream.

Optionally, the auxiliary data comprises scalable video data for use with the at least one VBR stream. Optionally, the auxiliary data comprises replacement video blocks which have corresponding video blocks in the at least one VBR stream. Optionally, the replacement video blocks are smaller than their corresponding video blocks in the at least one VBR stream. Optionally, at least some of the replacement video blocks are larger than their corresponding video blocks in the VBR stream. Optionally, the VBR stream has a substantially constant quality level. Optionally, the auxiliary data comprises mostly non-video data. Optionally, the auxiliary data comprises audio data. Optionally, at least 50% of the auxiliary data comprises data usable for enhancing the quality or the handling of the at least one VBR stream.

Optionally, the auxiliary data comprises index information about at least a portion of the at least one VBR stream. Optionally, the auxiliary data comprises index information about at least portion of the auxiliary data.

The method optionally includes storing the CBR stream before transmitting the stream. Optionally, at least 90% of the auxiliary data does not include content beyond that included in the VBR stream or beyond quality enhancements or format variations of the VBR stream. Optionally, the second receiving unit receives the VBR stream, generates at least one modified VBR stream from the VBR stream and auxiliary data in the CBR stream, and multiplexes the at least one modified VBR stream into a further CBR stream with at least some of the auxiliary data from the VBR stream. Optionally, the further CBR stream has the same bit rate as the CBR stream transmitted to the second receiving unit. Optionally, the further CBR stream is smaller than the CBR stream transmitted to the second receiving unit.

There is further provided in accordance with an exemplary embodiment of the invention, a method of compressing a video stream, comprising providing at least one variable bit-rate (VBR) video stream and multiplexing the at least one variable bit-rate video stream together with auxiliary data related to at least a portion of the at least one VBR stream, in a constant bit rate CBR video stream, wherein the at least one VBR stream has a bit rate which is equal to at least 95% of a bit rate of the CBR stream during at least one time interval along the VBR stream.

Optionally, the at least one VBR stream has a bit rate of at least 99% of the bit rate of the CBR stream during at least one time interval along the VBR stream. Optionally, at least one time interval of the CBR stream does not include auxiliary data. Optionally, providing the at least one VBR stream comprises providing a VBR stream having a substantially constant quality. Optionally, the maximal amount of video data in a CBR unit of the constant bit rate stream is no greater than the size of the largest VBR unit in the sequence of VBR blocks. Optionally, at least 90% of the auxiliary data does not include video content beyond quality enhancement or format variations of the VBR stream.

Optionally, the auxiliary data comprises data which enhances handling of the VBR stream. Optionally, packing the variable bit-rate video stream with auxiliary data comprises packing with replacement blocks which represent the same information as corresponding blocks in the VBR stream, but having different compression ratios than the corresponding blocks. Optionally, the auxiliary data comprises the audio information of the variable bit-rate video stream in an additional language.

There is further provided in accordance with an exemplary embodiment of the invention, a video compression server, comprising an input interface adapted to receive video streams; and a processor configured to compress a received video stream into a variable bit-rate video stream, formed of a sequence of VBR units differing in size over time and to multiplex the variable bit-rate video stream with auxiliary data so as to form a constant bit rate (CBR) video stream, formed of a sequence of CBR units of equal size, each CBR unit including a corresponding VBR unit, wherein at least one of the VBR units is at least 95% of the size of the corresponding CBR unit. Optionally, at least 5% of the VBR units have a size equal to at least 99% of the size of their corresponding CBR units. The server optionally includes storing a storage unit for storing the CBR units and wherein the processor is configured to store at least some of the CBR streams it generates in the storage unit.

There is further provided in accordance with an exemplary embodiment of the invention, a method of generating a video stream, comprising providing at least one variable bit rate (VBR) video stream, providing auxiliary data related to the VBR video stream; and multiplexing the VBR video stream with the auxiliary data so as to form a constant bit rate (CBR) video stream, wherein not more than 5% of the auxiliary data in the CBR stream is usable to increase the image quality of the VBR stream or to add video content beyond that included in the VBR stream.

Optionally, not more than 1% of the auxiliary data in the CBR stream is usable to increase the image quality of the VBR stream or to add video content beyond that included in the VBR stream. Optionally, the auxiliary data in the CBR stream cannot be used to increase the image quality of the VBR stream or to add video content beyond that included in the VBR stream. Optionally, the auxiliary data in the CBR stream comprises one or more of video and non-video information but only video information which is represented by the VBR video stream at a higher resolution.

The method optionally includes storing transmitting the constant bit rate video stream to a network unit which relates to the auxiliary data as padding packets which are ignored. The method optionally includes storing transmitting the constant bit rate video stream to statistical multiplexer which uses the auxiliary data to replace portions of the variable bit rate video stream when a channel managed by the statistical multiplexer is loaded. Optionally, the auxiliary data in the CBR stream does not include video information. The method optionally includes storing the constant bit rate video stream.

There is further provided in accordance with an exemplary embodiment of the invention, a method of generating a video stream, comprising providing at least one variable bit rate (VBR) video stream, providing non-video auxiliary data related to the VBR video stream; and multiplexing the VBR video stream with the non-video auxiliary data so as to form a constant bit rate (CBR) video stream. Optionally, at least 80% of the auxiliary data in the CBR stream comprises non-video data related to the VBR stream. Optionally, at least 50% of the auxiliary data in the CBR stream comprises audio data. Optionally, the auxiliary data in the CBR stream comprises audio data of the VBR stream in a language other than the language of audio information provided with the VBR stream. Optionally, at least 95% of the auxiliary data in the CBR stream comprises non-video data related to the VBR stream.

There is further provided in accordance with an exemplary embodiment of the invention, a method of generating a video stream, comprising providing at least one variable bit rate (VBR) video stream, providing auxiliary data related to the at least one VBR stream, which together with the VBR stream forms at least one constant quality video stream; and multiplexing the VBR video stream with the auxiliary data so as to form a constant bit rate (CBR) video stream, having video data of at least one constant quality video stream. Optionally, the at least one VBR stream has a non-constant quality.

There is further provided in accordance with an exemplary embodiment of the invention, a method of generating a video stream, comprising providing at least one variable bit rate (VBR) video stream, providing replacement video blocks which have corresponding video blocks 'in the VBR' stream and multiplexing the variable bit-rate video stream with the replacement blocks so as to form a constant bit rate (CBR) video stream.

Optionally, the replacement video blocks are smaller than their corresponding video blocks in the VBR stream.

BRIEF DESCRIPTION OF FIGURES

Exemplary non-limiting embodiments of the invention will be described with reference to the following description of embodiments in conjunction with the figures. Consistent annotation is generally used where the same component appears in more then one figure, in which.

DETAILED DESCRIPTION OF EMBODIMENTS

Network Overview

Figure 1:
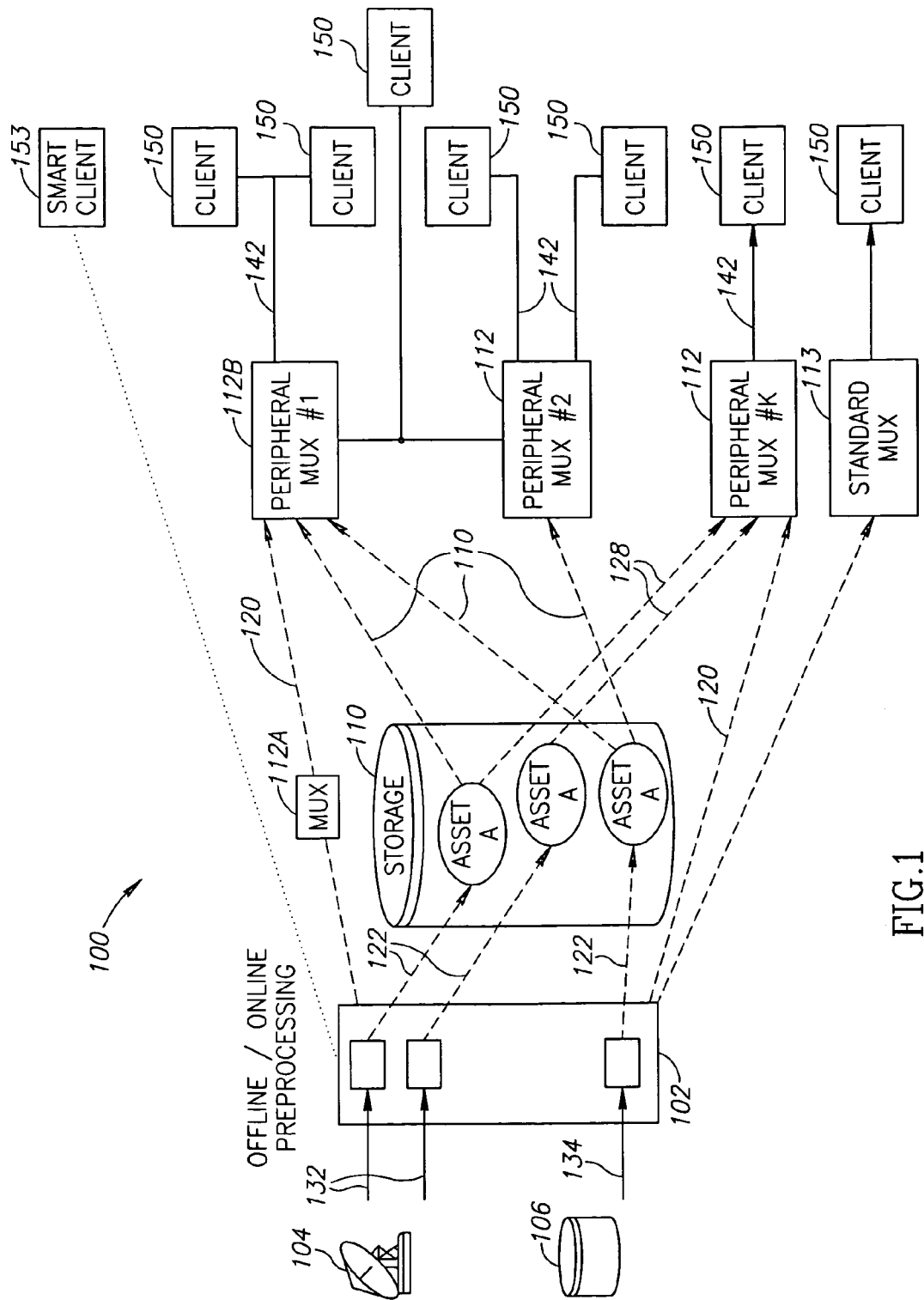
FIG. 1 is a schematic illustration of a video delivery system, in accordance with an exemplary embodiment of the invention.

FIG. 1 is a schematic illustration of a video delivery system 100, in accordance with an exemplary embodiment of the invention. System 100 includes a preprocessing unit 102 which is adapted to receive video streams and preprocess them for delivery to clients. A plurality of peripheral multiplexing units 112 receive the preprocessed streams and forward them on to respective clients 150.

In some embodiments of the invention, preprocessing unit 102 receives real time video streams 132, which are on their way to clients 150. The real time video streams may be received from substantially any source, including live production cameras (not shown) and broadcast sources (not shown) outside of system 100. The real time streams may be received through a satellite dish 104 or any other delivery network (e.g., cable, fiber, Ethernet) or may be generated locally (e.g., by a video camera). Alternatively or additionally to receiving real time video streams, preprocessing unit 102 may receive video files 134 from a storage media, such as a video movie bank 106.

Real time preprocessed streams 120 are passed in real time to peripheral multiplexing units 112 and 113 over any suitable data-link/network (e.g., satellite, fiber, Ethernet, Cable), for forwarding the video streams to clients 150 in real time. Non real-time video streams 122 (e.g., video on demand (VoD) of pre-stored movies) handled by preprocessing unit 102 are optionally passed for storage to an intermediate storage unit 110, which may be separate from movie bank 106 or included together with movie bank 106 in a single storage unit.

Each multiplexing unit 112, 113 optionally controls the flow of signals on one or more communication channels 142 leading to clients 150. In some embodiments of the invention, for each communication channel 142, a peripheral multiplexing unit 112 or 113 arranges the displays provided to each of the clients 150 serviced by the communication channel.

Communication channels 142 may include substantially any type of telecommunication channel, such as, for example, an HFC network QAM channel, a copper ADSL line or a shared backbone of an FTTP PON.

Multiplexing units 112 and 113 differ from each other in their support of non-standard video formats. Multiplexing unit 113 is a standard unit which does not support non-standard video formats, whilst multiplexing units 112 support non-standard formats. These differences are discussed hereinbelow in detail. In some embodiments of the invention, one or more clients are connected directly to preprocessing unit 102 and/or intermediate storage unit 110, without an intermediate multiplexing unit. Optionally, one or more directly connected clients are a smart client 153, which is adapted to use non-standard video formats prepared by preprocessing unit 102.

Pre-Processing

Figure 2:
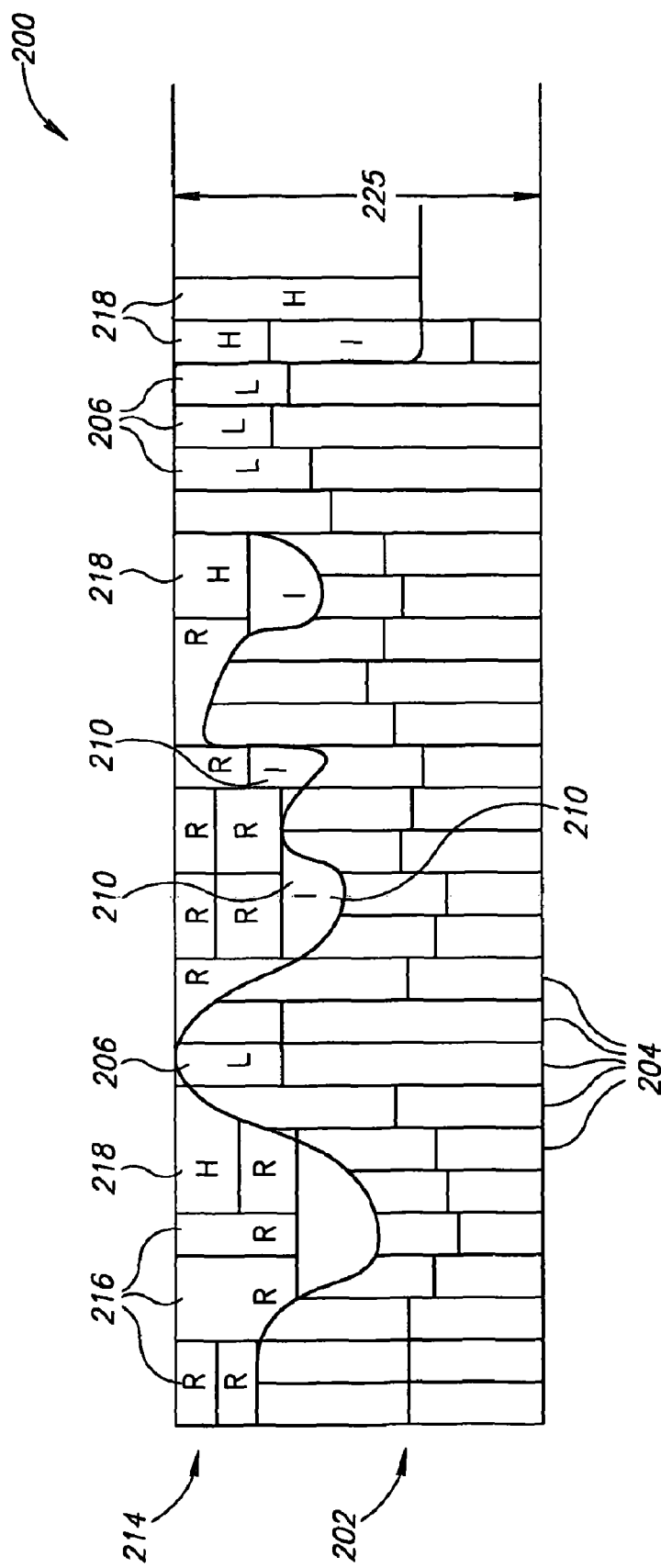
FIG. 2 is a schematic illustration of a constant bit rate video stream, in accordance with an exemplary embodiment of the invention.

FIG. 2 is a schematic illustration of a constant bit rate (CBR) video stream 200, in accordance with an exemplary embodiment of the invention. CBR stream 200 comprises a variable bit rate (VBR) portion 202 optionally formed of blocks 204, each block including data representing a frame, group of pictures (GOP), macro-block and/or any other sub-portion of a video stream. Together, the blocks of VBR portion 202 optionally form a complete representation of a video stream. The remaining portion of constant bit rate video stream 200, referred to herein as auxiliary portion 214, includes auxiliary data related to the video stream in variable rate portion 202. Optionally, at least 50%, at least 80% or even at least 95% of the auxiliary data is related to the video VBR stream.

Auxiliary portion 214 optionally includes mainly (e.g., at least 70%, at least 80% or even at least 90%) or even substantially entirely data which enhances the quality and/or handling of VBR portion 202. Optionally, at least 70%, 90% or even at least 95% of the auxiliary data in auxiliary portion 214 does not include substantial video content beyond quality enhancements or format variations of VBR portion 202.

In some embodiments of the invention, auxiliary portion 214 includes index (I) units 210 which each include indexes of a portion of the video stream, which can be used by peripheral multiplexing units 112 in performing their task. Index units 210 optionally indicate the sizes, beginning points and/or ending points of the video blocks of VBR portion 202 and/or of auxiliary portion 214. In some embodiments of the invention, auxiliary portion 214 includes an index of the information included in the auxiliary portion. Alternatively or additionally, index units 210 indicate the compression ratio used in generating each block and/or a quality rating of each block. Index units 210 may be designed, for example, as described in PCT publication WO 2006/061838, assigned application number IL2005/001326 and filed Dec. 8, 2005, the disclosure of which is incorporated herein by reference. Alternatively or additionally, index units 210 indicate the compression parameter values to be used in order to achieve one or more predetermined quality levels, for some or all of blocks 204 of VBR portion 202. In generating index units 210 in accordance with this alternative, preprocessing unit 102 optionally compresses sub-portions of the original video stream and/or blocks of VBR portion 202 in accordance with a plurality of different compression parameters and determines which of the compression parameters achieves a desired quality level and/or block size. Index units 210 list the compression parameter values found to be most suitable for each corresponding sub-portion and/or block 204 such that a receiver of index units 210 can adjust the size of VBR stream 202 by applying the compression parameter values appearing in the index units 210, without testing the results of using a plurality of compression parameters. In some embodiments of the invention, auxiliary portion 214 includes instructions for transcoding VBR stream 202 into a different format, as described, for example, in Israel patent application 184,450, filed Jul. 5, 2007, the disclosure of which is incorporated herein by reference.

Alternatively or additionally, auxiliary portion 214 includes replacement (R) blocks 216, each of which corresponds to a respective block 204 in variable bit rate portion 202, representing the same video content but at a lower quality level. The replacement blocks 216 may be used by multiplexing units 112 when a communication channel 142 momentarily does not have sufficient bandwidth for carrying the corresponding larger block 204.

In some embodiments of the invention, CBR stream 200 is constructed in a manner such that if it is received by a standard unit that does not recognize the structure of auxiliary portion 214 it will be considered as being a VBR stream 202 with padding.

Constant Quality

Optionally, the same maximal quality level is utilized in video stream 200 for substantially all the blocks. In some embodiments of the invention, this is achieved by having all the blocks 204 of portion 202 having the same quality selected for the video stream, and replacement blocks 216 in auxiliary portion 214 all having a lower quality. Optionally, the auxiliary data does not include video content beyond that represented by the VBR stream.

Alternatively, at some times within the video stream the selected compression level may generate blocks larger than can fit into constant bit rate video stream 200. In such cases, blocks 206 compressed by a higher compression ratio, to a lower (L) quality, are included in variable bit rate portion 202. Corresponding high (H) quality blocks 218 are optionally included in auxiliary portion 214, so that a receiving multiplexing unit 112 can use the higher quality block, if and when the bandwidth conditions of its controlled communication channel 142 allow such use.

Replacement blocks 216 are not necessarily located in CBR stream 200 at the same time interval as their respective block 204. Optionally, whenever CBR stream 200 does not have sufficient space for placing replacement block 216 at the same time as the respective block 204, the replacement block is placed before or after the respective block 204. Generally, high quality replacement blocks 218 are not included in the same time interval as the blocks 204 that they replace. In some embodiments of the invention, the corresponding higher quality blocks 218 and/or lower quality blocks 216 are always located before their corresponding block 204 or 206 in portion 202, such that the replacement of the blocks can be performed at the timing of VBR stream 202. Alternatively, the replacement blocks 216 and 218 are always located after their corresponding block 204 or 206 in portion 202. Further alternatively, the replacement blocks 216 and 218 in auxiliary portion 214 may be positioned before or after their corresponding blocks 204 or 206. Optionally, the replacement blocks 216 and 218 are located within a predetermined time interval from the corresponding block in portion 202, for example within a distance of less than a minute, less than 40 seconds or even less than 20 seconds. It is noted, however, that the replacement blocks 216 and 218 do not need to be very close to their corresponding block 204 or 206, and they may be distanced from each other by more than 10 seconds, more than 25 seconds or even by more than 50 seconds.

Figure 3:
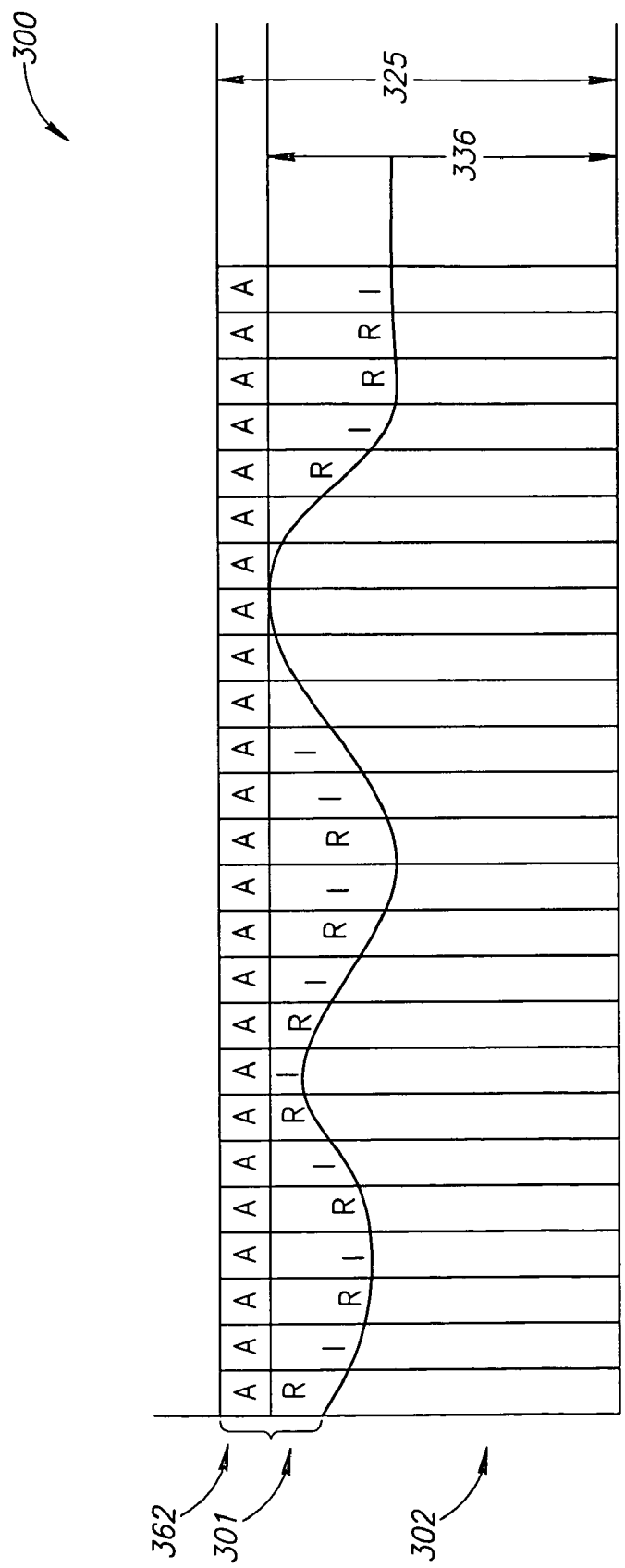
FIG. 3 is a schematic illustration of a constant bit rate video stream, in accordance with another exemplary embodiment of the invention.

FIG. 3 is a schematic illustration of a constant bit rate (CBR) video stream 300, in accordance with another exemplary embodiment of the invention. CBR stream 300 is formed of a VBR stream 302 which substantially corresponds to VBR stream 202 and an auxiliary portion 314.

Unlike CBR stream 200, which has a size 225 equal to the maximal size of VBR stream 202 (the maximum being reached at points 230), the size 325 of CBR stream 300 is greater than the maximal size 336 of VBR stream 302. In some embodiments of the invention, however, the capacity of the portion 362 of CBR stream 300 beyond the maximal size 336 of VBR stream 302 is not used for video data which can add to the quality of the video stream represented by VBR stream 302 and possibly does not include video data at all. Instead, portion 362 includes non-video data, such as audio (A) blocks and/or metadata blocks, and/or replacement blocks having lower quality than VBR stream 302. It is noted that although in FIG. 3 the audio blocks (A) are shown as being included in a separate portion 362 of CBR stream 300, this is not necessary and the audio data may sometimes be located at in other portions of CBR stream 300, while enhancement video data is located in portion 362. Such an arrangement does not contradict the requirement of these embodiments, that the maximal portion of CBR stream 362 used for video data enhancing VBR stream 302 at any time, does not exceed the difference between the maximal size of VBR stream and the size of the VBR stream at the point.

Furthermore, while the audio blocks are all shown as having the same size, this is not mandatory and in some embodiments of the invention audio blocks of different frames along the video stream have different sizes.

In referring to the size of CBR stream 200 and VBR stream 202, the term size refers to the amount of data in a given time interval, for example a number of seconds or number of displayed frames, e.g., a group of pictures (GOP).

As illustrated in CBR streams 200 and 300, in some embodiments of the invention the auxiliary data 214 and 314 includes both video and non-video data. The video data may form most of the auxiliary data, for example more than 60%, more than 80% or even more than 95% of the auxiliary data. Alternatively, the video data may form only a small part of the auxiliary data, for example less than 30% or even less than 10%. In other embodiments of the invention, the auxiliary portion 214 includes only video data or only non-video data.

In the above description, the auxiliary video data includes replacement blocks which may replace corresponding blocks in VBR stream 202. In other embodiments of the invention, auxiliary portion 214 comprises enhancement blocks which may be used to enhance the quality of the video in VBR stream 202.

Stream Generation

Figure 4:
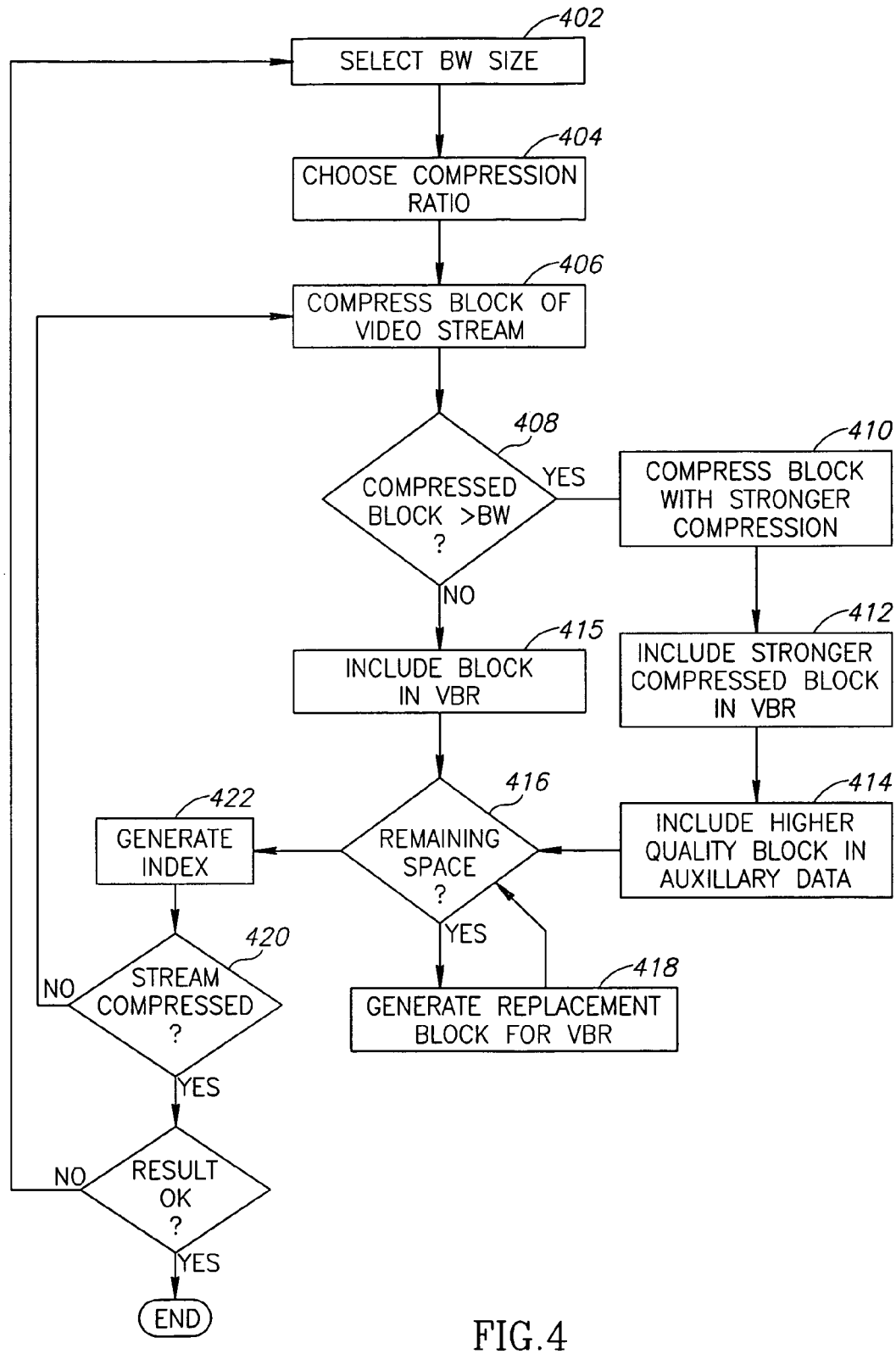
FIG. 4 is a method of compressing a video stream into a constant bit rate stream, in accordance with an exemplary embodiment of the invention.

FIG. 4 illustrates a method of compressing a video stream into a constant bit rate stream 200, in accordance with an exemplary embodiment of the invention.

A bandwidth size of constant bit rate stream 200 is optionally selected (402), for example according to the capacity of a channel on which the stream 200 is to be transmitted and/or the capacity of a storage unit in which it is to be stored. According to the selected bandwidth, a compression ratio expected to compress the video stream into the selected bandwidth size is chosen (404). The blocks of the video stream are compressed (406) using the chosen compression ratio, to form variable bit rate stream 202. If (408) at a specific time interval (e.g., for a specific sub-portion of the video stream) the compressed stream is larger than the selected bandwidth, a block of the video stream at the specific time interval is compressed (410) by a larger compression ratio and the more highly compressed block 206 is included (412) in variable bit rate stream 202, instead of a corresponding higher quality block 218. Higher quality block 218 is optionally included (414) in auxiliary portion 214. Otherwise, the block compressed using the chosen compression ratio is included (415) in the VBR stream.

The remaining volume of auxiliary portion 214, after allowing for space reserved for audio blocks, index blocks and/or other non-video blocks where applicable, is optionally determined (416). If additional space remains, one or more additional replacement blocks are generated (418) for at least one of the blocks of the VBR stream. The additional replacement blocks may be larger or smaller than the corresponding block in the VBR stream. The replacement blocks transmitted in the auxiliary portion in a specific time interval may correspond to blocks in the VBR stream at the same time interval or to blocks in the VBR stream before or after the specific time interval.

In some embodiments of the invention, an index unit is generated (422) for the current sub-portion of the video stream. Optionally, the index units 210 include indications of compression parameter values to be used with each video sub-portion of the stream. Alternatively, index units 210 include compression parameter values only for sub-portions for which auxiliary portion 214 does not include replacement blocks.

The compression (406) and subsequent acts are optionally repeated (420) for further sub-portions of the video stream, until the entire video stream is compressed.

In some embodiments of the invention, after the CBR stream is generated, if (424) the remaining auxiliary portion 214 is too large or is too small, the selection (402) of a bandwidth and/or the choosing (404) of a compression ratio may be repeated and the compression repeated with the newly chosen parameters, in order to achieve a better fitting of the compressed stream into constant bit rate stream 200. The repeating of the compression is generally not applicable to real time video streams but only to streams where sufficient time for performing the additional compression is available.

The compression is optionally performed using any suitable compression method known in the art. Appropriate compression methods include, for example, DIRAC, MPEG-2 and H.264. Optionally, the compression involves reducing the number of bits used to represent the pixels of the image or the Fourier transform of the image. Alternatively or additionally, the compression involves reducing the number of frames per minute of the video stream.

Alternatively to being set according to a desired size, the compression ratio is selected according to a desired quality level.

In some embodiments of the invention, the compression ratio is chosen such that less than a predetermined percentage of the blocks in variable bit rate stream 202, for example less than 5% or even less than 1%, are low quality blocks. Alternatively or additionally, the compression ratio is chosen such that at least a predetermined percentage of the blocks in variable bit rate stream 202, for example at least 0.5% or even at least 2%, are low quality blocks.

Alternatively or additionally, the compression ratio is chosen such that variable bit rate stream 202 occupies at least a predetermined percentage of stream 200, for example at least 80%, at least 90% or even at least 95% thereof. In some embodiments of the invention, when the received video stream has a suitable size, the video stream may be transmitted as it is received, without further compression.

Usage

Referring back to FIG. 1, in some embodiments of the invention, CBR stream 200 is forwarded to multiplexing unit 112 by preprocessing unit 102. The multiplexing units 112 extract the VBR stream from CBR stream 200 and transmit it on link 142 to the client 150. Multiplexing units 113 that do not support the structure of auxiliary data 214 optionally relate to CBR stream 200 as a VBR stream with padding and use the VBR stream as is, ignoring the "padding". Multiplexing units 112, which support auxiliary data 214, however, extract the data in auxiliary portion 214 and use the data in performing the multiplexing. Thus, the advantages of using the auxiliary data can be enjoyed by one or more multiplexers 112 without necessitating complete replacement of all of standard multiplexers 113.

In some embodiments of the invention, different multiplexing units 112 have different buffer sizes and hence can use the auxiliary data to different extents. Multiplexing units 112 having a small buffer may be configured to only use scaling data in the auxiliary portion that is received before the scaling data is required or immediately after, according to the size of the buffer.

Alternatively to converting the CBR stream 200 into a VBR stream, one or more of multiplexers 112 convert the received CBR stream into another CBR stream. Such CBR to CBR conversion is performed, for example, in cases in which a video stream passes through a plurality of multiplexers 112 between preprocessing unit 102 and clients 150, such as the path including multiplexers 112A and 112B. The CBR to CBR conversion optionally includes extracting the VBR stream from the received CBR stream, adjusting the extracted VBR stream and then generating a different CBR stream from the adjusted VBR stream. The CBR to CBR conversion is optionally performed in order to convert from a received CBR stream of a first size to an adjusted CBR stream of a different size, for example smaller than the size of the received CBR stream.

In some embodiments of the invention, adjusting the VBR stream comprises replacing at least one block of the VBR stream with a replacement block from the auxiliary data. The block removed from the VBR stream is optionally inserted into the auxiliary data, so that it can be used at a later time if so required. If the adjusted CBR stream is smaller than the received CBR stream, multiplexer 112A may be required to drop some of the replacement blocks included in the auxiliary data. The replacement blocks dropped are optionally selected according to the likelihood that they will be required in the future. For example, in some embodiments of the invention, when possible, the blocks dropped are those for which index units 210 list compression parameter values which can be used for quick reconstruction of the blocks. When a CBR stream is provided to a client 150, the client optionally relates to it as a VBR stream with padding. Smart client 153, on the other hand, may use the auxiliary data to enhance the VBR stream, based on knowledge of the protocol governing the auxiliary data.

CONCLUSION

In some embodiments of the invention, some or all of the video blocks in CBR stream 200 are encrypted. Optionally, the packets may be replaced while they are encrypted, without decryption for determining their content. This may be achieved, for example, by using blocks on predetermined boundaries (e.g., frame boundaries), which allow easy replacement and/or by using data in the meta-data describing the video stream.

While the above description relates mainly to a CBR stream including a single VBR stream, the methods of the present invention may be used also for a plurality of VBR streams included in a single CBR stream. The auxiliary portion of the CBR stream includes information related to one or more of the VBR streams, for example according to the importance of different VBR streams. Including a plurality of VBR streams together in a single VBR stream allows for use of more auxiliary data for one of the streams than for others. In some embodiments of the invention, a CBR stream for storage includes a plurality of VBR video streams which are generally provided together, for example different movies relating to a specific holiday.

It will be appreciated that the above described methods may be varied in many ways, including, changing the order of steps, and/or performing a plurality of steps concurrently. It will also be appreciated that the above described description of methods and apparatus are to be interpreted as including apparatus for carrying out the methods and methods of using the apparatus.

It should be understood that features and/or steps described with respect to one embodiment may sometimes be used with other embodiments and that not all embodiments of the invention have all of the features and/or steps shown in a particular figure or described with respect to one of the specific embodiments.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Variations of embodiments described will occur to persons of the art. Therefore, the scope of the invention is limited only by the elements and limitations as used in the claims, wherein the terms "comprise," "include," "have" and their conjugates, shall mean, when used in the claims, "including but not necessarily limited to."

We claim:

1. A method of media transmission, comprising:
providing at least one variable bit rate (VBR) video stream;
multiplexing the at least one VBR video stream together with auxiliary data related to the at least one VBR video stream, in a constant bit rate (CBR) stream;
transmitting the CBR stream to a first receiving unit, which is adapted to discard the auxiliary data as padding and use the at least one VBR stream; and
transmitting the CBR stream to a second receiving unit, which is adapted to extract the same auxiliary data and use it in further handling of the at least one VBR stream,
wherein the second receiving unit receives the VBR stream, generates at least one modified VBR stream from the VBR stream and auxiliary data in the CBR stream, and multiplexes the at least one modified VBR stream into a further CBR stream with at least some of the auxiliary data from the VBR stream.

2. A method according to claim 1, wherein the auxiliary data comprises scalable video data for use with the at least one VBR stream.

3. A method according to claim 1, wherein the auxiliary data comprises replacement video blocks which have corresponding video blocks, describing same video content at a different quality level, in the at least one VBR stream.

4. A method according to claim 3, wherein the replacement video blocks are smaller than their corresponding video blocks in the at least one VBR stream.

5. A method according to claim 3, wherein at least some of the replacement video blocks are larger than their corresponding video blocks in the VBR stream.

6. A method according to claim 1, wherein the VBR stream has a substantially constant quality level.

7. A method according to claim 1, wherein the auxiliary data comprises mostly non-video data.

8. A method according to claim 1, wherein the auxiliary data comprises audio data.

9. A method according to claim 1, wherein at least 50% of the auxiliary data comprises data usable for enhancing the quality or the handling of the at least one VBR stream.

10. A method according to claim 1, wherein the auxiliary data comprises index information about at least a portion of the at least one VBR stream.

11. A method according to claim 1, wherein the auxiliary data comprises index information about at least portion of the auxiliary data.

12. A method according to claim 1, comprising storing the CBR stream before transmitting the stream.

13. A method according to claim 1, wherein at least 90% of the auxiliary data does not include content beyond that included in the VBR stream or beyond quality enhancements or format variations of the VBR stream.

14. A method according to claim 1, wherein the further CBR stream has the same bit rate as the CBR stream transmitted to the second receiving unit.

15. A method according to claim 1, wherein the further CBR stream is smaller than the CBR stream transmitted to the second receiving unit.

* * * * *